United States Patent [19]
Morizumi

[11] Patent Number: 5,414,480
[45] Date of Patent: May 9, 1995

[54] OVERHEAD PROJECTOR

[75] Inventor: Masaaki Morizumi, Omiya, Japan

[73] Assignee: Fuji Photo Optical Co., Ltd., Saitama, Japan

[21] Appl. No.: 206,184

[22] Filed: Mar. 7, 1994

[30] Foreign Application Priority Data

Mar. 5, 1993 [JP] Japan .................. 5-071186

[51] Int. Cl.⁶ .............................................. G03B 21/00
[52] U.S. Cl. ...................................... 353/119; 353/70; 353/DIG. 4
[58] Field of Search ................. 353/DIG. 3, DIG. 4, 353/DIG. 6, 119, 63, 64, 65, 66, 69, 70

[56] References Cited

U.S. PATENT DOCUMENTS

| | | | |
|---|---|---|---|
| 3,930,723 | 1/1976 | Holt | 353/70 |
| 4,002,408 | 1/1977 | Amma | 353/70 |
| 4,795,252 | 1/1989 | Kyhl | 353/DIG. 3 |
| 4,863,263 | 9/1989 | Kanai | 353/DIG. 6 |

FOREIGN PATENT DOCUMENTS

| | | | |
|---|---|---|---|
| 3316246 | 11/1984 | Germany | 353/DIG. 3 |
| 0097332 | 5/1985 | Japan | 353/DIG. 3 |

*Primary Examiner*—William A. Cuchlinski, Jr.
*Assistant Examiner*—William C. Dowling
*Attorney, Agent, or Firm*—Keck, Mahin & Cate

[57] ABSTRACT

An overhead projector has a flat stage, for placing a sheet material thereon, which is inclined such that a normal line of the flat stage, which is in alignment with the optical axis of the projection lens, inclines an angle relative to a vertical line so that a reflection mirror disposed above the projection lens at an angle of 45 degrees directs an image projected by the projection lens toward a remote screen at a desired angle of elevation.

2 Claims, 3 Drawing Sheets

OVERHEAD PROJECTOR

BACKGROUND OF THE INVENTION

1. Field of the Invention

This invention relates to the structure of an overhead projector for projecting an image of a sheet material on a screen remote from the overhead projector.

2. Description of Related Art

Conventionally, overhead projectors are often used on conferences, lectures and educational or presentation meetings to project images of, for instance, documentary information and/or drawings recorded on transparent sheet materials, such as chart films, on a remote screen standing vertically and located remote from the overhead projector. Such an overhead projector is configured by various elements, such as a light source, a stage on which a sheet material is placed, a projection lens system, a reflective mirror, etc.

In order to provide an easy understanding of the configuration of the transmission type of conventional overhead projector, reference is made to FIGS. 5 and 6. The transmission type of overhead projector includes its essential optical elements such as a light source 2, a projection lens system 3 and a reflective mirror 4. The light source 2 is fixedly installed beneath a flat transparent stage 1, on which a transparent sheet, such as a film sheet, is placed, so as to illuminate the transparent sheet. The projection lens system 3, which is installed above the stage 1 such that its optical axis X is in alignment with a normal line Y of the flat transparent stage 1, forms and directs an optical image of documents and/or drawings recorded on the transparent sheet to the reflective mirror 4, placed above the projection lens system 3 at an angle of 45 degrees relative to the optical axis X of the projection lens system 3, so as to project an enlarged image of the documents and/or drawings of the transparent sheet onto a remote screen 5 standing approximately vertically.

With such a conventional overhead projector, the reflective mirror 4 is absolutely indispensable in order to reflect and direct the optical axis X of the projection lens system 3 upward and toward the remote screen 5. Specifically, when the optical axis of X of the projection lens system 3 must be directed toward the remote screen 5 at an angle of elevation $\theta$ relative to a horizontal line H, the reflective mirror 4 is further tilted or inclined half the angle of elevation $\theta$ from its original position, as indicated by a reference 4A in FIG. 5, wherein it is at an angle of 45 degrees relative to the horizontal line H. In such a manner, the enlarged image of the documents and/or drawings is projected overhead on the remote screen 5 so as to be observed or watched by viewers without any obstruction.

However, with the conventional overhead projector, tilting or inclining of the reflective mirror 4 upward from its original position, in which the reflective mirror 4 is at an angle of 45 degrees, due to a demand of projecting of an image at an angle of elevation so as to form it on the remote screen 5 at the best height for viewers, subjects the image unavoidably to unacceptable distortion. Specifically, as shown in FIG. 6 by example in which the optical axis X of the projection lens system 3 X is unfolded straight for an easy understanding, when there is a relative inclination of an angle of $\theta$ between the optical axis X of the projection lens system and the normal line Y of the screen 5, which is produced as an angle of elevation by the reflective mirror 4, a rectangular transparent sheet 6 is projected on the screen 5 as an enlarged distorted image 7 having an expanded upper side and a reduced lower side or a reversed trapezoidal configuration. In this instance, the enlarged image 7 is out of focus or indistinctly clear, in particular, at the upper and lower side margins on the screen 5 and consequently, gives viewers even an unpleasant feeling.

SUMMARY OF THE INVENTION

It is, therefore, an object of the present invention to provide an overhead projector which can minimize distortion of an image caused by tilting or inclining a reflection mirror.

It is another object of the present invention to provide an overhead projector which can project a sharp image overhead on a remote screen or in a position desirable for viewers.

The foregoing objects of the present invention are achieved by providing an overhead projector, which may be of a transmission type or a reflection type, for projecting an image of a sheet material placed on a flat stage onto a remote screen standing almost vertically with the use of a reflection mirror, disposed above a projection lens system and inclined an angle of 45 degrees, which directs the image formed by the projection lens system toward the remote screen. The flat stage is inclined relative to a horizontal surface, on which the overhead projector is placed, so as to incline its normal line, with which the optical axis of the projection lens system is aligned, an angle relative to a vertical line.

With the overhead projector of the present invention, when the angle of inclination of the flat stage is established equal to a desired angle of elevation at which an image is projected on the remote screen at the best height, the overhead projector projects a sharp image of a sheet material placed on the flat stage overhead onto the remote screen without noticeable distortion. The reflection mirror may be rotatable about a horizontal line so as to change the angle of elevation, and even it is rotated, the overhead projector projects an image of a sheet material placed on the flat stage overhead onto the remote screen with less distortion.

BRIEF DESCRIPTION OF THE DRAWINGS

The above and other object of the present invention will be clearly understood from the following detailed description directed to preferred embodiments thereof when considered in conjunction with the accompanying drawings, in which.

DETAILED DESCRIPTION OF THE PREFERRED EMBODIMENT

Figure 1:
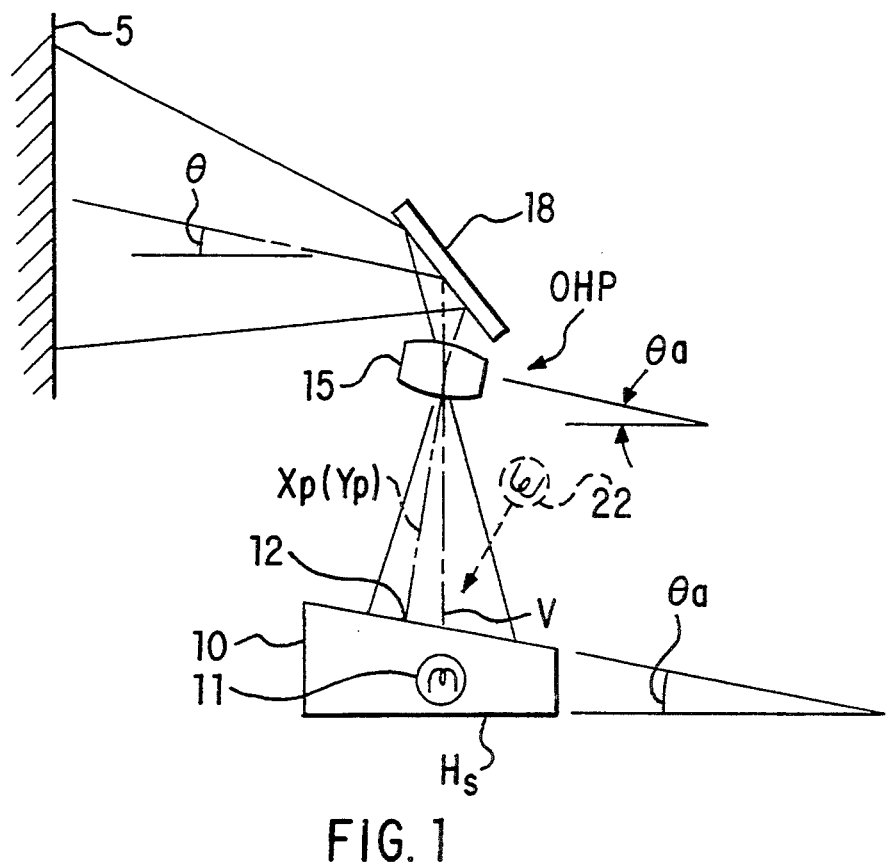
FIG. 1 is a schematic illustration of an overhead projector in accordance with a preferred embodiment of the present invention.
Figure 2:
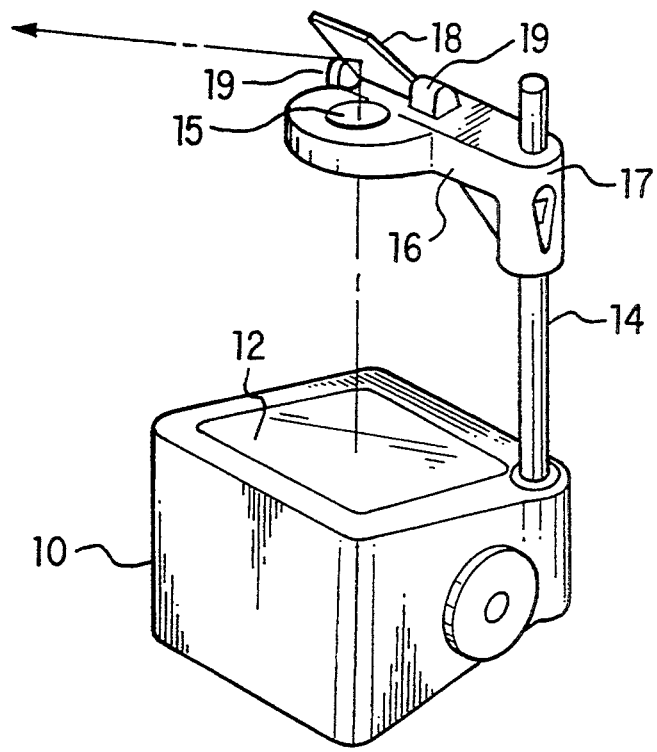
FIG. 2 is a perspective view of the overall structure of the overhead projector shown in FIG. 1.

Referring to the drawings in detail, and, in particular, to FIGS. 1 and 2, an overhead projector OHP in accordance with a preferred embodiment of the present invention is shown as a transparent type by example. This overhead projector OHP includes a generally box-shaped stage 10 having a flat bottom wall 9 and a flat transparent top wall 12, which is hereafter referred occasionally to as a transparent stage surface, inclined an angle of $\theta_a$ relative to the bottom wall 9 for placing a transparent sheet with documentary information and/or drawings thereon. A light source 11 is fixedly installed within the box-shaped stage 10 and illuminates the transparent sheet placed on the transparent top wall 12. The box-shaped stage 10 is fixedly provided at one of its corners with a post rod or stay 14 on which a frame 16, holding a projection lens system 15, is mounted by means of a frame extension 17 formed integrally with the frame 16 for up and down slide movement and rotative movement. The frame 16 thus mounted on the post rod 14 locates the projection lens system 15 approximately right above the center of the top wall 12 so as to align the optical axis $X_p$ of the projection lens system 15 with the normal line $Y_p$ of the transparent stage surface 12 and focus an image on a screen 5 standing vertically and located remote from the overhead projector OHP. It is inevitable that the normal line $Y_p$ of the transparent stage surface 12 is inclined the angle of $\theta_a$ relative to a vertical axis V. The frame 16 is further integrally formed with a pair of brackets 19 for supporting a pivot rod (hidden in FIG. 2) by which a reflective mirror 18 is pivoted so as to turn about the pivot rod, namely a horizontal line.

As was previously described, and schematically and clearly shown in FIG. 1, the top wall 12 of the box-shaped stage 10 is tilted or inclined the angle of $\theta_a$ relative to the vertical axis V in which the light source 11 is located, or otherwise relative to a horizontal surface $H_s$ on which the box-shaped stage 10 is placed. Similarly, the projection lens system 15 is tilted so as to direct its optical axis $X_p$ inclined the same angle of $\theta_a$ relative to the vertical line V or relative to the horizontal surface $H_s$. In this instance, when the angle of elevation $\theta$ at which the reflection mirror 18 directs an image reflected thereby to the screen 5 is adjusted equal to the angle of $\theta_a$, the overhead projector OHP projects an image of a transparent sheet placed on the top wall 12 of the box-shaped stage 10 on the remote screen 5 with the best height without distortion.

Figure 3:
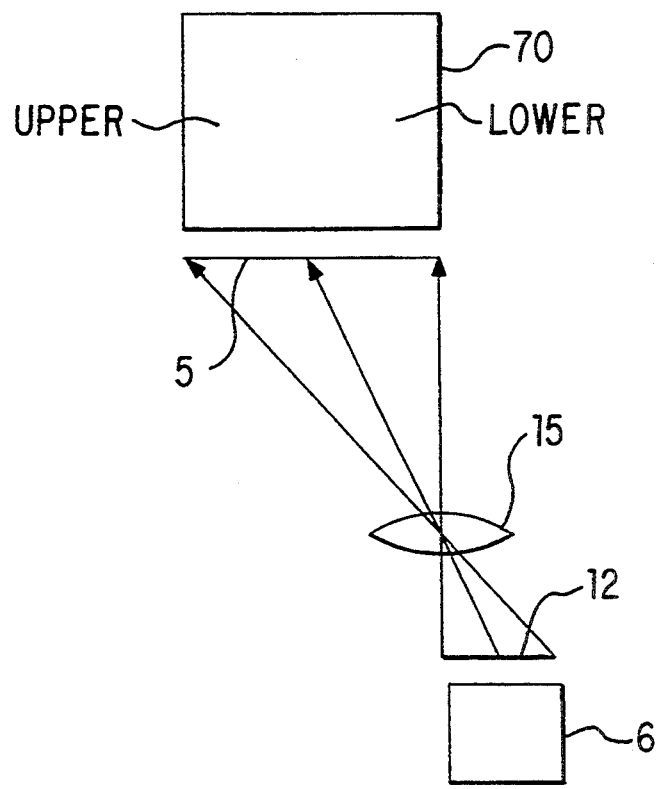
FIG. 3 is a diagram showing an optical path between a stage surface and a screen of the overhead projector shown in FIGS. 1 and 2.

Referring to FIG. 3 schematically illustrating an optical aspect or geometry of the overhead projector OHP with the reflection mirror 18 tilted or inclined the angle of $\theta_a$, which provides the angle of elevation $\theta$, there is created a parallel relation that the transparent stage 12, the projection lens system 15 and the remote screen 5 are arranged in parallel to one another. This parallel arrangement enables the overhead projector OHP to project an image 70 precisely similar in geometrical configuration to a film sheet 6 placed on the stage surface 12 onto the remote screen 5 without having distortion and being out of focus.

Figure 4A:
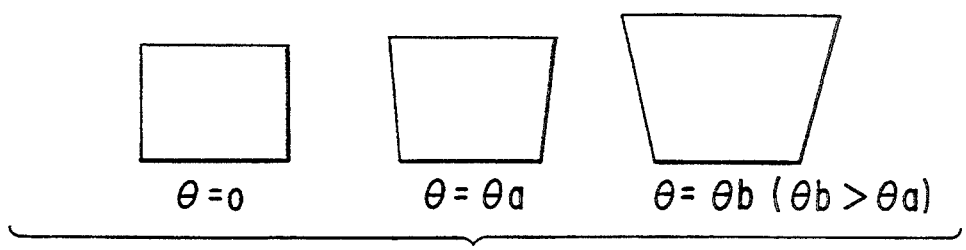
FIG. 4(A) is an illustration showing distortion of images projected by a conventional overhead projector at different angles of elevation.
Figure 4B:
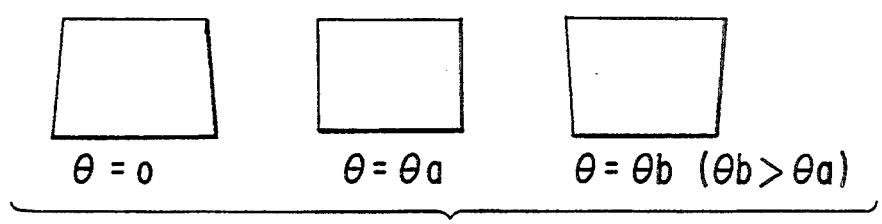
FIG. 4(B) is an illustration showing distortion of images projected by the overhead projector shown in FIGS. 1 and 2 at different angles of elevation.
Figure 5:
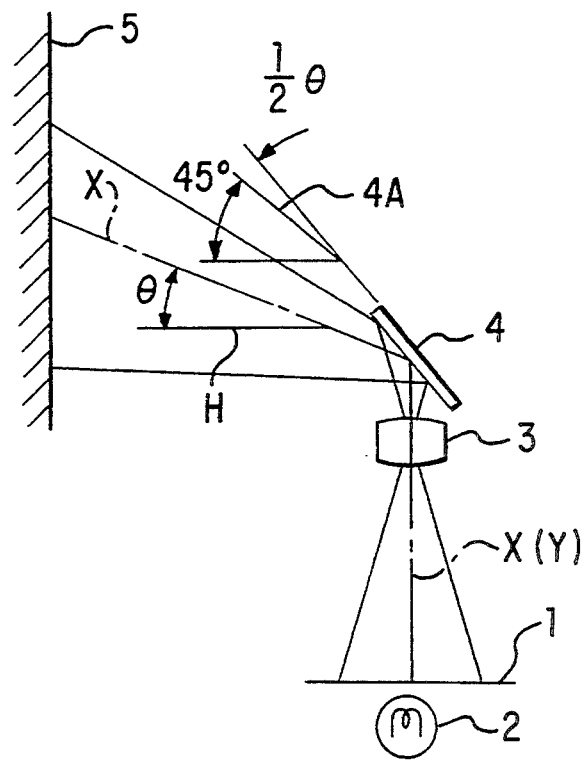
FIG. 5 is a schematic illustration, similar to FIG. 1, of a conventional overhead projector.
Figure 6:
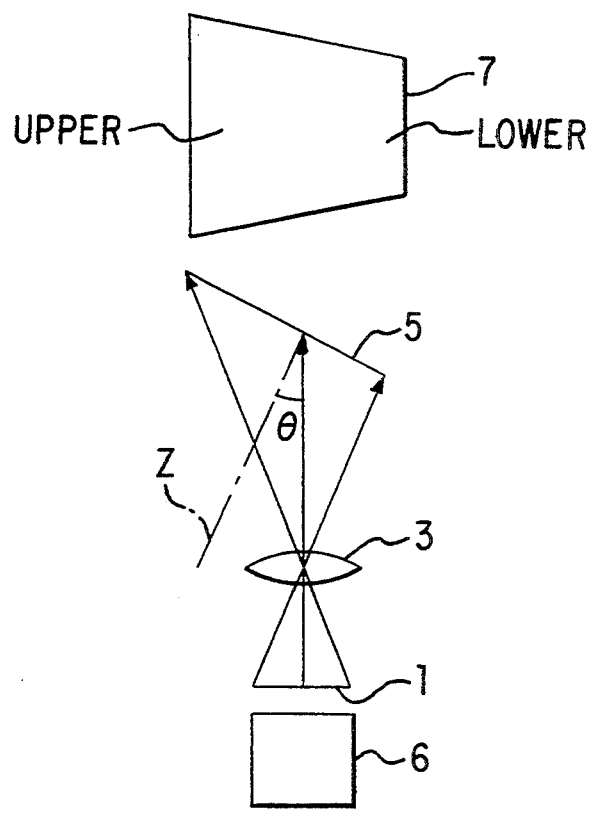
FIG. 6 is a diagram, similar to FIG. 3, showing an optical path between a stage surface and a screen of the conventional overhead projector shown in FIG. 5.

Referring to FIGS. 4(A) and 4(B), various patterns of distortion of images, projected by the conventional overhead projector and the overhead projector of the present invention, according to different angles of elevation $\theta$ of the reflection mirror 4, 15 are shown for comparison. As apparent from FIG. 4(A) showing images projected by the conventional overhead projector, with an increase in the angle of elevation $\theta$ of the reflection mirror 4 from an angle of zero (0) to angles of $\theta_a$ and $\theta_b$ ($\theta_a < \theta_b$), an enlarged image increases its distortion on the remote screen 5. In contradistinction, as shown in FIG. 4(B), an enlarged image projected by the overhead projector of the present invention has its distortion minimized or disregarded at the angle of elevation $\theta$ equal to the inclined angle $\theta_a$ of the stage surface 12 and still kept small on both sides of the inclination angle $\theta_a$, as shown by example for the angle of zero (0) on the smaller side of the inclination angle $\theta_a$ and the angle $\theta_b$ on the larger side of the inclination angle $\theta_a$. Accordingly, making of the angle of tilt or inclination $\theta_a$ of the transparent stage surface 12 relative to the horizontal surface $H_s$, which is equal to the inclination of the normal line $Y_p$ of the stage surface 12 with which the optical axis $X_p$ of the projection lens system 15 is aligned, coincide with the angle of elevation $\theta$ of the reflection mirror 18 at which the overhead projector OHP projects overhead an image on the remote screen 5 at the most suitable height, provides a prominently sharp image with less distortion or without distortion of the film sheet 6 to viewers. In addition, an image is projected with lesser distortion by the overhead projector OHP even with its reflection mirror 18 inclined an angle larger or smaller than the angle $\theta_a$ as compared to the conventional overhead projector.

It is to be understood that if the overhead projector is of the reflection type, the same result and advantages are provided by replacing the transparent stage 12 with a reflective stage and disposing a light source 22 above the generally box-shaped stage 10 and offset from the optical axis OX of the projection lens system 15.

It is also to be understood that although the present invention has been described in detail with respect to preferred embodiments thereof, various other embodiments and variants may occur to those skilled in the art, which fall within the scope and spirit of the present invention. Such other embodiments and variants are intended to be covered by the following claims.

What is claimed is:

1. An overhead projector for projecting an image of a sheet material on a remote screen standing almost vertically, said overhead projector comprising:
    a stage having a sheet material placed on its stage surface and having a normal line inclined, at an angle of inclination, relative to a vertical line;
    a light source for illuminating said sheet material;
    a projection lens system, having an optical axis aligned with said normal line, for projecting an image of said sheet material; and
    a reflection mirror, disposed above said projection lens system at an angle of 45 degrees, for directing said image toward said screen at a desired angle of elevation which is equal to said angle of inclination, said reflection mirror being rotatable so as to change said angle of elevation, wherein said stage surface is reflective and said light source is disposed above said stage surface and offset from said optical axis.

2. An overhead projector as defined in claim 1, wherein said stage is shaped as a box having at least a flat bottom wall and a flat transparent top wall, inclined relative to said flat bottom wall, serving as said stage surface.

* * * * *